United States Patent [19]
Rater

[11] 3,844,269
[45] Oct. 29, 1974

[54] APPARATUS FOR SAWING ROCK

[76] Inventor: Rudolph Rater, 23020 Marine View Dr., Des Moines, Wash. 98016

[22] Filed: July 25, 1972

[21] Appl. No.: 274,849

[52] U.S. Cl. .............................. 125/13 R, 125/35
[51] Int. Cl. .......................... B28d 1/04, B28d 7/04
[58] Field of Search .......... 125/12, 13 R, 13 SS, 16, 125/35; 269/139–146, 202, 227, 282–284, 258, 261

[56] References Cited
UNITED STATES PATENTS

| | | | |
|---|---|---|---|
| 1,125,566 | 1/1915 | Lang | 125/35 |
| 2,371,085 | 3/1945 | Waters | 125/13 R |
| 2,416,703 | 3/1947 | Marshall | 125/35 |
| 2,486,765 | 11/1949 | Snyder | 125/13 R |
| 2,743,717 | 5/1956 | Wilkin | 125/13 R |
| 2,881,667 | 4/1959 | Edert | 269/258 X |
| 2,906,151 | 9/1959 | Van De Water | 269/145 |
| 2,909,169 | 10/1959 | Vonada | 125/13 R |
| 2,921,785 | 1/1960 | Underhill | 269/218 |
| 3,089,478 | 5/1963 | Jones | 125/35 |

*Primary Examiner*—Al Lawrence Smith
*Assistant Examiner*—Nicholas P. Godici
*Attorney, Agent, or Firm*—Graybeal, Barnard, Uhlir & Hughes

[57] ABSTRACT

Lapidary apparatus for holding and feeding a rock or the like into a saw to sever the rock along a selected cutting line including rock supporting members gripping the rock at spaced points on both sides of the cutting line. The rock supporting members are mounted on a carriage movable longitudinally toward or away from the cutting blade such that the portions of the rock on both sides of the cutting blade are supported during and after severance. The rock supporting members are adjustable to grip the surfaces of irregularly shaped rocks and are mounted for rotational adjustment with respect to the saw blade. The rock supporting members may further be positioned with respect to a rotary saw blade to feed the rock directly toward the center of the blade. The rock feeding carriage includes a power feed having a torque limiting apparatus controlling the pressure with which the rock is moved against the cutting blade. Rock holding apparatus for faceting a rock and for use in making precision angle cuts is also disclosed. A method of sawing a rock on a rotary saw along a selected cutting line including supporting the rock on both sides of the cutting line, moving the rock toward the center of the saw blade, rotating the rock with respect to the saw blade if necessary to cut completely through the rock, and supporting both portions of the severed rock.

9 Claims, 13 Drawing Figures

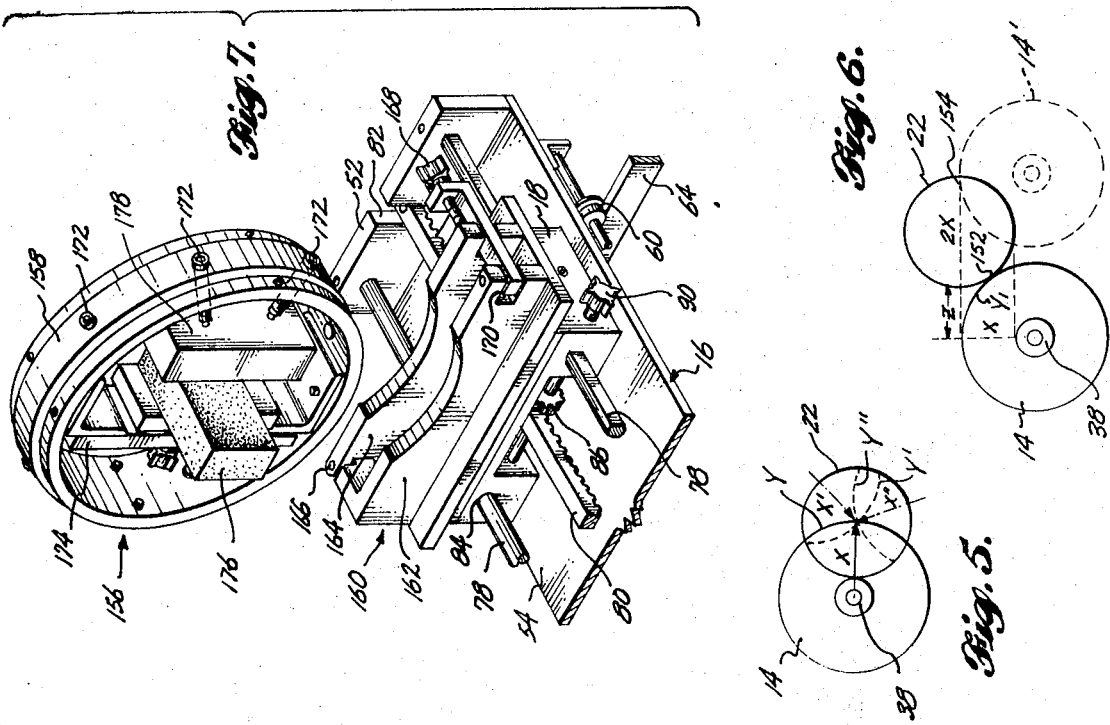
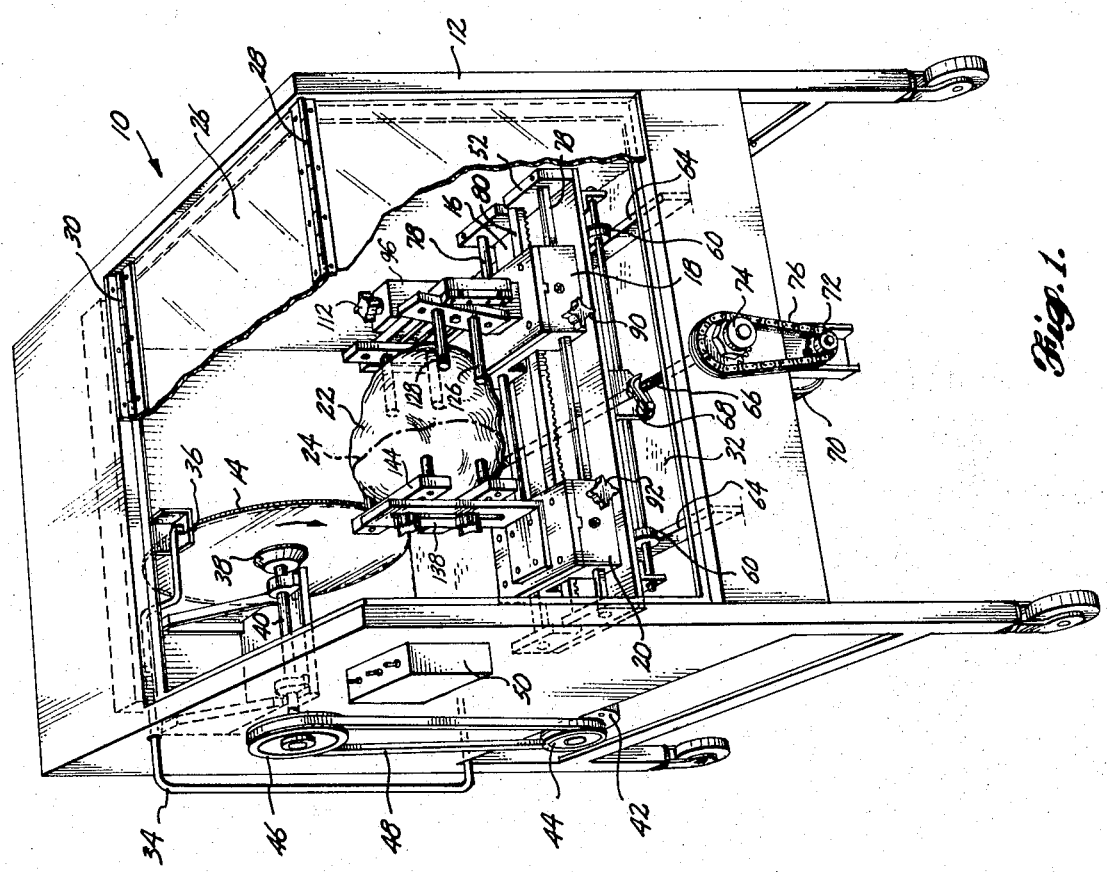

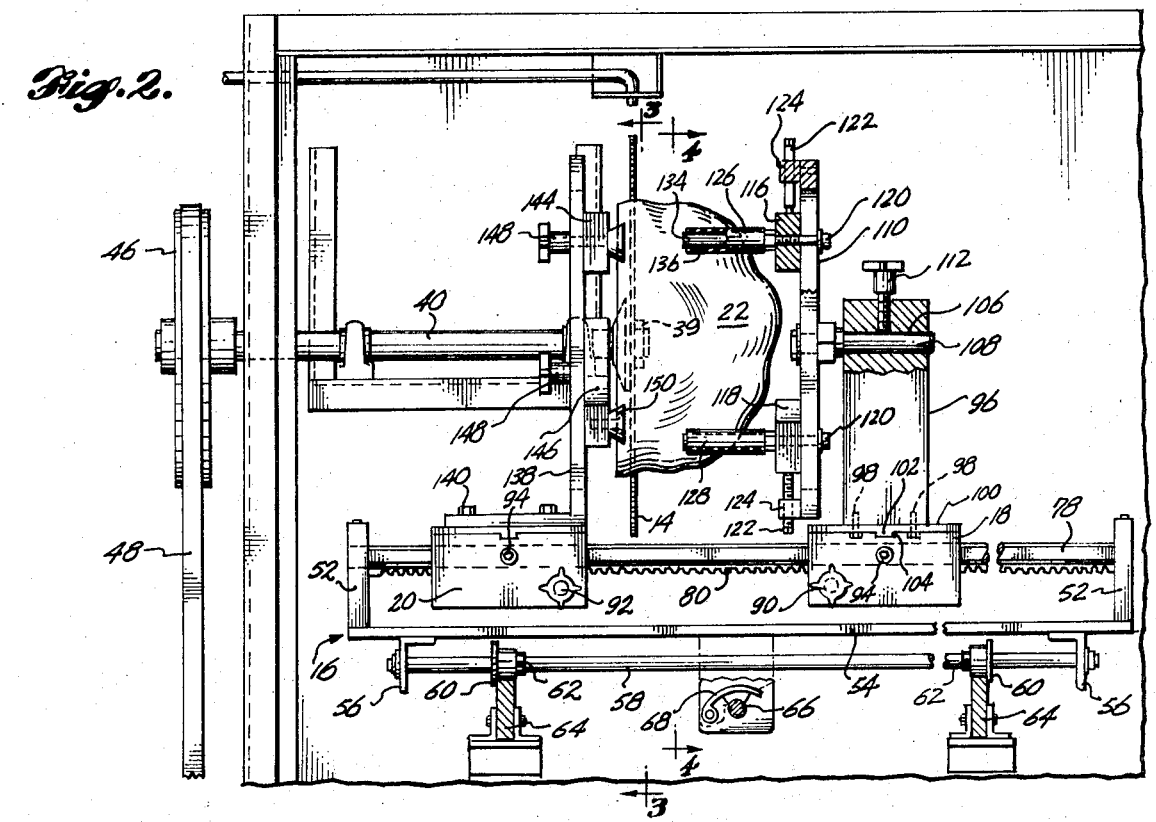

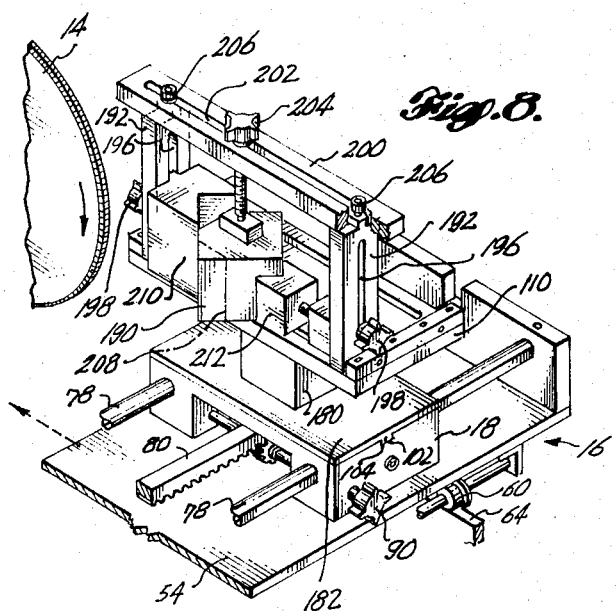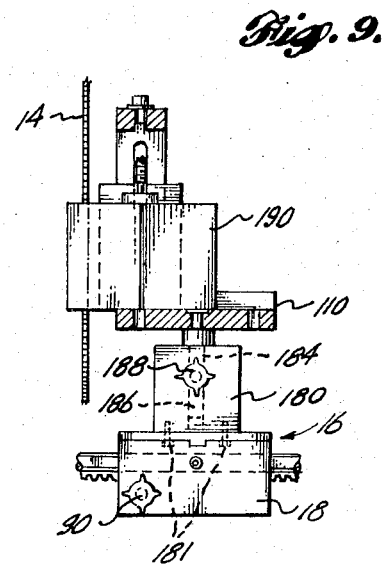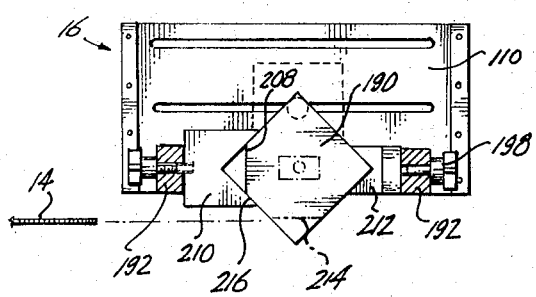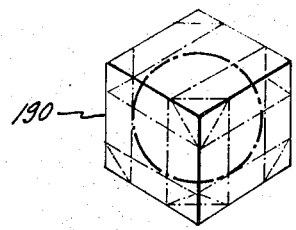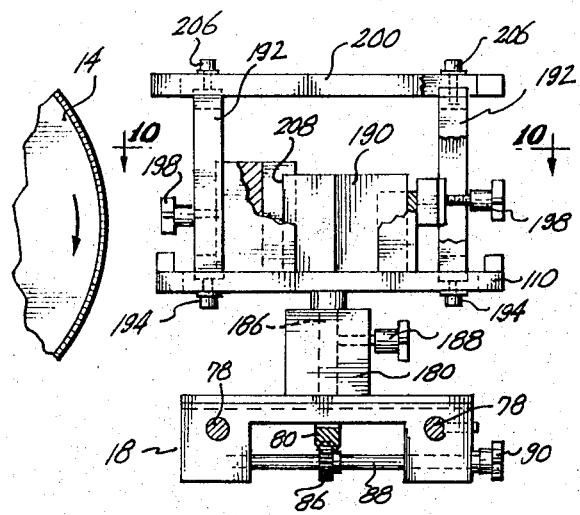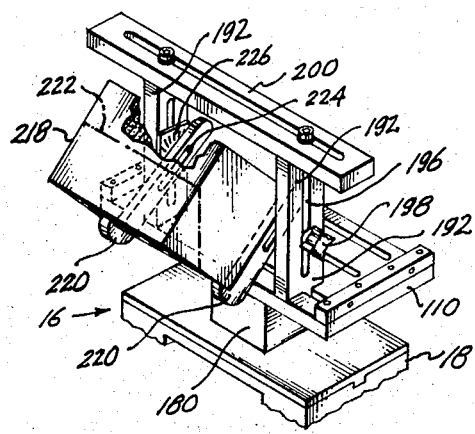

APPARATUS FOR SAWING ROCK

BACKGROUND OF THE INVENTION

1. Field of the Invention

This invention relates, in general, to a method and apparatus for sawing rock or like hard materials, and in particular to a method and apparatus for rapid and precise cutting of stones to form gems or the like.

2. Description of the Prior Art

In the lapidary field, both "slabbing" saws and "trim" saws are known and used to reduce a rough stone to a "blank" which is then commonly ground and polished to a finished gem. Vonada U.S. Pat. No. 2,909,169 discloses a multi-purpose apparatus said to be suitable for the performance of all sawing operations encountered in the production of a gem. A rock holding vise mounted on a carriage clamps the stone to be cut such that it extends laterally outward from the vise into the cutting plane of the saw which contacts the stone as the carriage is moved toward the saw blade. The stone to be cut is clamped on only one side of the cutting blade and thus during sawing, the force with which the rock is moved against the cutting surface of the blade tends to either twist the rock in its support vise or bend the cutting blade itself causing blade drift and a resulting nonplanar cut surface which necessitates additional time-consuming and wasteful grinding.

Known lapidary saws do not make provision for firmly holding the severed portions of a rock after cutting, and it is common for a severed slab to either crack upon falling to the bottom of the sawing apparatus, or worse, fall and be trapped between the cutting blade and the saw mount causing the costly saw blade to buckle and be rendered worthless.

Cracking or "heeling" is another common problem encountered during the sawing of rocks supported on only one side of the cutting line wherein the uncut portion of the rock along the cutting line fractures as a result either of vibration or lateral forces exerted thereon by the saw blade when the cut is nearly completed. This produces a stone having a substantially smooth cut surface with a roughened raised edge portion which again must be ground away.

Johnson U.S. Pat. No. 3,168,893 discloses a typical saw and vise arrangement wherein the stone is held by a movable generally planar jaw against a second fixed generally planar jaw. Firmly gripping irregularly shaped rocks for alignment of the selected cutting line with the saw blade using this vise arrangement is quite difficult and often results in the rock slipping or twisting when moved against the cutting blade. As shown in the Johnson patent, the stone to be cut is commonly mounted such that it first contacts the saw blade at a point either above or below the center or hub of the saw blade. In this arrangement, only a relatively small portion of the cutting surface of the blade is actually cutting the rock at any one time consequently requiring extended time periods to complete a cut as well as repeated unclamping, rotation and reclamping of the stone to allow the blade to pass completely therethrough. It will be understood that unclamping and reclamping an irregularly shaped stone with the precision necessary to realign the slot already cut in the stone with the saw blade is extremely difficult.

Marshall and Speed U.S. Pats. Nos. 2,416,703 and 2,431,282 disclose apparatus for holding crystals during cutting. Jenkins and Chase U.S. Pat. Nos. 237,285 and 1,375,777 disclose known forms of clamps for holding relatively flat pieces of stone to be cut or ground, and Jones U.S. Pat. No. 3,089,478 discloses an angularly adjustable miter table for use with a masonry saw. None of these references provide an adequate solution to the problems to which the instant invention is addressed.

BRIEF SUMMARY OF THE INVENTION

This invention relates to lapidary saw apparatus and a method of sawing whereby rocks of varying and irregular shape may be cut more rapidly and accurately than is presently possible using known equipments. In one embodiment wherein the rock saw is of the circular central hub mounted type, the apparatus includes rock gripping members adapted to grip the rock to be cut at spaced points on opposed side of the cutting line such that both portions of the rock are firmly held and supported during cutting and after severance. The rock gripping members are mounted on a movable carriage in a manner to allow the rock to be rotated with respect to the saw blade while maintaining the alignment of the cutting line with the cutting edge of the saw. Further, the rock gripping members hold the rock elevated above the carriage such that the rock is fed directly toward the central hub of the saw. The carriage itself is movable longitudinally toward and away from the cutting edge of the saw by means of a power drive which includes a torque limiter such that the force with which the rock is fed against the saw blade may be maintained below a desired level during cutting.

The rock gripping members themselves may vary in design, one embodiment comprising a platform mounted for rotation on a pedestal with base members which support outwardly extending rock gripping fingers also mounted for rotation on the platform. The gripping fingers themselves may be movable on the base members and the combined movability of the rock gripping fingers, the base members, the platform and the pedestal itself which is mounted on a table means for transverse movement on the longitudinally movable carriage allow an irregularly shaped rock to be firmly gripped during sawing, while also allowing the position of the rock to be varied with respect to the saw blade without releasing and regripping the rock itself.

The rock gripping fingers may be varied in length to allow for the support or rock portions of varying thickness, such as are encountered, for example, during slab sawing.

In another embodiment the apparatus supporting one side of the rock to be cut may comprise a circular chuck releasably mounted on the table which is transversely movable on the carriage. Rock holding apparatus particularly useful for accurately repeating selected angle cuts is also disclosed as is a method of cutting a rock which may include the steps of selecting a cutting line on the rock, gripping the rock on opposed sides of the cutting line, supporting the rock on the opposed sides of the cutting line during cutting and after severance of the rock along the cutting line, and feeding the rock during cutting directly toward the center of a rotary saw and rotating the rock without releasing and regripping the rock when necessary to allow the saw blade to pass completely therethrough.

BRIEF DESCRIPTION OF THE DRAWINGS

FIG. 1 is a perspective view of a typical rock sawing apparatus made according to the instant invention.

FIG. 2 is a partial front elevation view of a typical rock sawing apparatus made according to the instant invention set up to perform a slabbing cut.

FIG. 3 is a sectional view taken along lines 3—3 in FIG. 2.

FIG. 4 is a sectional view taken along lines 4—4 in FIG. 2.

FIG. 5 is a schematic diagram illustrating the sawing of a rock by moving the rock toward the center of a rotary saw.

FIG. 6 is a schematic diagram illustrating the known method of sawing a rock by moving the rock toward the saw on a line above the center of the rotary saw.

FIG. 7 is a partial perspective view of another typical rock holding apparatus made according to the instant invention.

FIG. 8 is a partial perspective view of still another typical rock holding apparatus made according to the instant invention, particularly useful for making repeated precision angle cuts.

FIG. 9 is a partial elevation view of the rock holding apparatus of FIG. 8.

FIG. 10 is a partial plan view of the rock holding apparatus of FIG. 8.

FIG. 11 is a partial side view of the rock holding apparatus of FIG. 8.

FIG. 12 is a schematic diagram illustrating the saw cuts needed to produce a faceted sphere from a rectangular block.

FIG. 13 is still another embodiment of a typical rock holding apparatus made according to the instant invention for making repeated cuts at selected angles.

DETAILED DESCRIPTION OF THE INVENTION

Referring initially to FIG. 1, one embodiment of a rock sawing apparatus 10 made according to the instant invention is disclosed including a wheeled supporting cabinet structure 12 mounting a hub mounted circular rock saw blade 14 and a rock supporting structure including longitudinally movable carriage 16 mounting transversely movable tables 18 and 20 which in turn mount apparatus to support the rock 22 to be sawed along selected cutting line 24. As shown, the wheel support cabinet 12 includes a hinged cover portion 26 of transparent plastic material or the like which when moved to the closed position as shown prevents the escape of rock chips, dust or splashed oil from within the cabinet, and which may be pivoted about hinges 28 and 30 to an open position for the mounting or removal of the workpiece.

Cabinet 12 includes an open oil reservoir 32 in its lower portion from which oil or other coolant is pumped by conventional pump means through conduit 34 onto the cutting edge of the rock sawing blade at conduit end 36. Rock saw blade 14 is mounted by means of hub 38 and nut 39 (FIG. 2) on shaft 40 which may be driven by a conventional electric motor 42 through pulleys 44 and 46 by means of the belt 48. Control box 50 may be conveniently mounted on one side of cabinet 12 as shown, to mount switches for controlling the rotation of the saw blade, the operation of the coolant pump, and the movement of carriage 16 whereby the rock 22 is moved into the rotating blade 14.

Referring additionally to FIG. 2, carriage 16 is shown to include upright side wall portions 52 mounted on bottom plate 54 which also mounts L-shaped brackets 56 on its bottom surface. Brackets 56 mount a pair of bearinged axles 58 (refer also to FIGS. 3 and 4) on which flanged wheels 60 are fixedly mounted by means of set screws 62 such that they ride on tracks 64 mounted adjacent the bottom portion of the support cabinet 12 to extend generally parallel to and on opposed sides of the saw blade 14. As shown, the tracks 64 may be spaced laterally from the saw blade 14 at varying distances, but it will be understood that it is contemplated to space these tracks equidistantly from the opposed sides of the saw blade to reduce the possibility of bending forces being transmitted to the saw blade as the rock 22 is moved thereagainst.

Threaded rod 66 is interconnected with carriage 16 by means of conventional torque limiting apparatus 68 and as shown, rod 66 is rotated to drive the carriage 16 toward and away from cutting blade 14 by means of electric motor 70 through toothed sprockets 72 and 74 which are interconnected by drive chain 76. As will be understood, the torque limiting apparatus 68 grips rod 66 in a manner such that the carriage 16 is moved longitudinally with respect to the saw blade when the rod is rotated, however when the resistance to carriage movement, such as that generated by the rock 22 being forced against blade 14 exceeds a preset limit, the grip of the torque limiting apparatus on rod 66 slips thereby preventing too fast feeding of the rock into the saw. It has been found that a relatively low feed force limitation in the four to six pound range allows for satisfactory sawing operation while limiting heat buildup often caused by too rapid movement of the rock into the saw thus keeping the blade relatively cool.

Carriage side walls 52 include openings in which transverse support rods 78 are spacedly mounted. Toothed rod 80 is also mounted in center notches 82 in side walls 52. Transversely movable table 18 and 20 include aligned openings 84 in their lower portions sized to snugly surround and be slidably on the support rods 78. As is best seen in FIGS. 3 and 4, each of the tables 18 and 20 also includes a circular toothed member 86 mounted on an axle 88 which extends through one of the side walls of the tables 18 and 20 to mount knobs 90 and 92. Hand rotation of knobs 90 and 92 causes the teeth on member 86 to engage the cooperating teeth on the bottom portion of rod 80 whereby the tables may be moved on support rods 78 transversely on the carriage 16. Locking means such as set screws 94 are threadably mounted to extend through one of the sidewalls of the tables 18 and 20 to bear against one of the support rods 78 to prevent transverse movement of the tables on the carriage 16 during sawing.

As described more completely hereafter, tables 18 and 20 may mount varying types of rock supporting apparatus whereby any shaped rock to be sawed may be held firmly on opposite sides of the cutting blade such that the rock is fed straight into the cutting blade as carriage 16 is moved theretowards. This straight line supported movement into the saw blade eliminates vibration and bending forces heretofore encountered when the rock to be sawed is supported on only one side of the cutting blade. Further, it will be understood that the cut off portion of the rock is supported after severance and not allowed to fall thus reducing the possibilities of either the cut off portion of the rock cracking or being caught between the saw blade and the carriage or other structure which may cause the saw blade to buckle. The double sided support has also been found to reduce "heeling" during cutting.

Referring particularly to FIGS. 2 and 4, one form of rock supporting structure particularly useful for gripping large and irregularly shaped rocks is disclosed mounted on table 18. Pedestal 96 is mounted by means of conventional bolts 98 to plate 100. Plate 100 includes tongue portion 102 mateable with groove 104 in the top surface of table 18 thus allowing plate 100 to be rapidly and surely mounted thereon to exact right angles to the saw blade 14. As will be seen in the drawings, this tongue and groove alignment feature is also provided on table 20 and allows the various disclosed forms of rock holding apparatus to be interchangeably mounted on the tables always at exact right angles to the saw blade.

Pedestal 96 includes a cylindrical opening 106 near its top portion through which shaft 108 which is bolted to platform 110 extends. A threaded locking or thumb screw 112 is provided to bear against rod 108 to allow the platform 110 to be selectively rotated or fixed in position. As illustrated, platform 110 includes a plurality of laterally spaced longitudinal slots 114 in which base member 116 and 118 may be selectively mounted by means of conventional nuts and bolts 120. The base members may be moved longitudinally in the slots and selectively rotated as required to grip the irregular surface of the rock to be cut. Platform 110 further includes end mounted screws 122 threaded in cooperating holes in end flanges 124 to bear against base members 116 and 118 to provide additional longitudinal gripping pressure to the rock gripping fingers 126 and 128 selectively threaded into cooperating holes 130 and 132 in the respective base members 116 and 118. As seen in FIG. 2, fingers 128 may comprise a central metal pin 134 having a cover 136 of rubber or like material to increase the grip of the fingers on the surface of the rock. The length of fingers 126 and 128 may be varied to accommodate irregularities in the surface of the rock with the length limitation being that they not extend into the selected cutting line on the rock where they would contact the saw blade. The configuration of the fingers themselves may be varied so long as they maintain the capability of acting in concert to grip and support the rock to be sawed. The wide flexibility in the positioning of the rock gripping fingers 126 and 128 available through use of the instant apparatus allows even the most irregularly shaped rock to be firmly supported during cutting.

Referring particularly to the rocks shown being slabbed in FIG. 2, once a flat surface has been cut thereon, the entire rock may be slabbed by unclamping and reversing the rocks 180° such that the flat surface bears directly on base members 116 and is held thereagainst by beveled gripping pads, such as pads 150 mounted on base members 116 in place of fingers 126. It will be understood that all cuts are thus automatically parallel to the flat surface on base members 116, and that the rock may be easily unclamped and reclamped in precisely the same alignment with the cutting blade.

Referring now to FIGS. 2 and 3, it will be seen that a second form of rock gripping apparatus is mounted on transversely movable table 20. L-shaped support frame 128 is mounted by means of bolts 140 to the top portion of table 20. As shown, support frame 138 includes a single longitudinal slot 142 in which a pair of vertically spaced base members 144 and 146 are mounted by means of threaded hand operable thumb screws 148 extending therethrough. It will be understood that additional longitudinal slots may be provided in frame 138 to provide additional positional flexibility.

As illustrated, base members 144 and 146 in turn mount beveled gripping pads 150 peculiarly suited for gripping and supporting a relatively thin slab to be cut from the rock 22. Referring to FIG. 1, however, it will be seen that rock gripping fingers of varying length may be mounted on the base members 144 and 146 as needed to support the portion of the rock on the table 20 side of the cutting saw. As with the supporting structure mounted on table 18, the location of gripping members 150 may be varied by mounting these members in different combinations of the spaced holes 152 and 154 in the base members as well as by rotating the base members with respect to the support member 138.

As is best seen in FIG. 2, the rock supports mounted on tables 18 and 20 hold the rock 22 a distance vertically above carriage 16 such that the rock is substantially centered with respect to the center of circular saw 14. It will thus be understood that movement of the carriage toward the saw feeds the rock to be cut directly on line toward the center of the saw and it has been found that this directional feeding coupled with the capability of rotating the rock during cutting without having to realign the cutting line with the saw blade allows for significant reduction in the cutting time necessary to sever a rock. The advantages gained by feeding the rock directly toward the center of the saw are illustrated schematically in FIGS. 5 and 6. Referring first to FIG. 5 and assuming the saw blade 14 to have a 24 inch diameter and a 4 inch central hub 38, it will be understood that the effective cutting radius $X$ of the saw is 10 inches. Assuming for this illustration that rock 22 has a circular cross section with a 20 inch diameter, the rock could be severed using the apparatus of the instant invention by first moving the rock into the saw until the edge of the rock nearly contacts hub 38 to cut an arcuate section Y on the cutting line of the rock. It will be understood that in making this cut the lead edge of the saw 14 saws through the rock a distance $X$, i.e., 10 inches. When this cut has been completed, carriage 16 is backed off from the saw blade, thumb screw 112 loosened and the platform 110 rotated till the arrow X' is aligned with the center of the saw. Thumb screw 112 is retightened and the rock is again moved into the saw to cut an arc Y' shown in dotted line, the lead edge of the saw again cutting a distance $X'$, i.e., 10 inches. Upon completion of this cut the rock is again backed off from the blade, rotated and sawed along arrow X' to complete the severance of the rock with a total sawing distance of 30 inches. The maintenance of the selected cutting line in alignment with the saw edge during rotation of the platform 110 allows for a maximization of sawing time and a minimization of rock clamping and alignment time thereby allowing the cut to be completed in substantially the time necessary for the saw to cut 30 inches.

Referring now to FIG. 6, and again assuming the rock 22 to have a circular cross section and a diameter of 2$X$ or 20 inches, and saw 14 to have a diameter of 24 inches with a 4 inch hub 38, the severing of the rock in the conventional manner by feeding the rock into the saw on a line above the center of the saw is illustrated. In order to cut through one-half of the rock, the rock must be moved with respect to saw 14, or vice versa, from the left-hand position wherein the saw first contacts the rock at point 152 to the dotted line position 14' wherein the top of the saw completes the cut along the diameter of the rock at point 154. As illustrated, the sawing distance through which the saw blade 14 must move to complete the cut through the center of the rock is represented by the equation 2$X$ + $Z$, $Z$ being the distance which the top of the saw must move before it even begins to contact the rock in this case approximately 8.4 inches. To complete the cut in the conventional manner, the rock is unclamped and rotated 180° with respect to its supporting mount, the cutting line realigned with the saw blade, the rock reclamped and the 2$X$ + $Z$ cut repeated. It will thus be understood that the distance which the saw must move to cut the 20 inch rock in the conventional manner is 4$x$ or 40 inches plus the additional 2$Z$ or 16.8 inches distance for a total of more than 56 inches of cutting or nearly twice the 30 inches of rock which need be cut using the instant invention. It will be seen that substantial sawing distance is eliminated through use of the instant apparatus and that a proportional amount of sawing time as well as realignment time is also saved.

Further, it is known that during sawing in the conventional manner shown in FIG. 6, rock 22 has a strong tendency to move vertically with respect to the saw blade as the rock is moved thereagainst. A similar tendency is encountered when a rock is fed to the lower portion of a saw, thus necessitating a strong gripping of the rock to prevent its being dislodged from the vise in which it is held. It has been found that feeding a rock directly toward the center hub of a saw as is done in the instant invention substantially reduces the tendency of the rock to move vertically with respect to the saw blade.

Referring now to FIG. 7, an alternate form of rock gripping apparatus suitable for mounting on table 18 is disclosed to include a circular chuck portion 156 including an upraised step 158 adapted to be clamped by vise 160. Vise 160 includes a fixed wall portion 162 and a movable wall portion 164 hinged at 166 to pivot thereabout in response to the loosening or tightening of threaded screw clamp 168 which, as shown, is interconnected with the fixed wall portion at hinge 170 and adapted to bear against the pivotal wall portion 164 distal from hinge 166 to provide a firm clamping action to maintain the chuck parallel the saw blade at all times.

Circular chuck 156 includes a plurality of threaded holes 172 spaced about its perimeter into which bolts may be inserted to either mount an internal rock supporting structure such as U-shaped support 174, for example, or to bear directly upon the rock segment 176 to be cut or upon a spacing block 178 positioned adjacent the rock to be sawed. Variation of the mounting mechanisms positioned within the circular chuck, as well as variation in the position and number of bolts inserted through holes 172, allows a wide variety of differently shaped and sized rocks to be clamped firmly within the circular chuck. A rock mounted in the circular chuck may be easily rotated during sawing by loosening the vise and rotating the entire circular chuck without unclamping the rock itself held therewithin. Further, it will be understood that this structure may be used in conjunction with the rock holding apparatus shown mounted on table 20 in FIGS. 1 and 2 to support the rock to be cut on both sides of the cutting line.

Referring now to FIGS. 8–12, still another rock holding structure particularly useful for repeatedly making saw cuts at exact predetermined angles is shown mounted on table 18. The apparatus includes a relatively low pedestal 180 fixedly mounted by means of conventional bolts 181 on top plate 182 which is automatically aligned on table 18 by means of tongue 102 in groove 104. As illustrated, low pedestal 180 includes a vertical cylindrical opening 184 in which a cooperatingly sized shaft 186 is mounted. Laterally extending thumb screw 188 is provided to selectively bear against shaft 186 to prevent rotation of the platform 110 mounted thereon.

It will be understood that the structure mountable on horizontally disposed platform 110 may be varied depending on the size and shape of the rock to be cut, but for illustrative purposes a structure suitable for sawing a rectangular block 190 along the lines generally indicated in FIG. 12 to produce a faceted sphere which may be ground and polished to spherical shape is illustrated. A pair of vertical post members 192 are shown bolted adjacent the ends of platform 110 by means of conventional bolts 194 which extend through one of the longitudinal slots 114 in platform 110. Post members 192 include longitudinally extending slots 196 through which thumb screws 198 extend. Post members 192 are linked by cross beam 200 also having a longitudinally extending slot 202 through which thumb screw 204 extends downwardly. Cross beam 200 is connected to the vertical uprights 192 by means of conventional nuts and bolts 206 which also extend through longitudinal slot 202. To make the corner cut shown by dotted line 208, block 190 is positioned between uprights 192 and thumb screw 204 is rotated downwardly to pin the rock firmly against platform 110. Notched support members 210 and 212 which are interconnected with thumb screws 198 are pressed against the rock to prevent its moving laterally during sawing.

After cut 208 has been made, thumb screws 198 and 204 are loosened and the block 190 pivoted 90° and reclamped such that the block is automatically aligned for cut 214 as shown in FIG. 10. It will be seen that notwithstanding the removal of the corner portion of the block by the cut 208, this corner is still firmly seated and aligned in support 210 by the contact between the notch in block 210 and the remaining side surfaces of block 190 at 216. Repeated similar unclamping, rotation, pivoting, and reclamping of the block after the sawing of corner portions therefrom results in the production of a faceted sphere.

This rock supporting structure may also be used to make repeated cuts at precisely the same predetermined angle on a number of generally similarly shaped blocks which may be substituted for each other after each cut. Differently sized and shaped notched blocks may be substituted for notched blocks 210 and 212 to accommodate the shape of the rock to be cut, as the length and position of the thumb screw 198 and 204 may also be varied if needed.

Referring now to FIG. 13, a variation in the structure of FIGS. 8–11 is disclosed wherein the rock 218 to be cut is clamped laterally directly by the vertical uprights 192 while supported at a selected angle with respect to the saw blade by means of support arms 220 to allow the rock to be cut along cutting line 222.

Support arms 220 include longitudinally extending slots 224 through which they are pinned by thumb screws 198 which also extend through vertical slots 196 in uprights 192. Angular indexes 226 may be marked on the facing surfaces of the uprights 192 to allow the support arms 220 to be easily maintained or returned to a chosen angle thus allowing a series of saw cuts to be carried out at the same preselected angle. The support arms themselves may be reversed endwise where necessary to prevent their contacting the saw blade during sawing, or they may be removed altogether and the rock positioned directly on platform 110 to make a vertical cut with the platform edge either paralle or at an angle to the said blade.

From all of the above it will be seen that a method of sawing a rock is disclosed comprising the steps of selecting a cutting line on a rock to be cut; gripping the rock with rock clamps at spaced points on both sides of the cutting line, the rock clamps being mounted on separate tables which are transversely movable with respect to the saw blade and independently movable in the transverse direction with respect to each other; moving the clamped rock to align the cutting line chosen thereon with the cutting edge of the saw; feeding the rock into the saw blade to cut the rock along the preselected cutting line while continuing to support the rock on the opposed sides of the cutting line; feeding the rock directly toward the center of the rotary cutting saw to shorten the cutting time needed to sever the rock; and, retracting the rock from the saw and rotating it while maintaining the grip on at least one opposed side of the rock to maintain the alignment of the cutting line and the rock saw, and again feeding the rock toward the center of the saw blade to sever the rock while continuing to support the rock on opposed sides of the cutting line.

The invention may be embodied in other specific forms without departing from the spirit or central characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. Sawing apparatus for accurately severing a rock on a selected cutting line comprising:
    fixed rotary saw means;
    carriage means movable longitudinally toward and away from said saw means;
    rock holding means mounted on said carriage, said rock holding means comprising first rock gripping means mounted on said carriage to grip said rock at points on one side of said cutting line and second rock gripping means mounted on said carriage to grip said rock at points on the opposite side of said cutting line, said first and second rock gripping means being transversely movable with respect to each other on said carriage, and said first rock gripping means being rotatable with respect to said carriage and said second rock gripping means;
    said first and second rock gripping means making gripping contact with said rock only at points transversely spaced from said cutting line whereby said saw can completely sever said rock without contacting said rock gripping means; and
    said rock holding means supporting said rock to restrain transverse movement thereof to prevent said rock from binding on said saw during or after severing.

2. The sawing apparatus of claim 1 wherein said rock holding means include vertical extension means to support said rock above said carriage and in horizontal alignment with the center of said rotary saw such that when said carriage is moved longitudinally toward said saw said rock is moved toward the center of said rotary saw.

3. The sawing apparatus of claim 1 wherein said first rock gripping means includes position adjustable finger portions gripping the surface of said rock to be cut on one side of said cutting line; and said second rock gripping means includes position adjustable finger portions gripping the surface of said rock to be cut on the opposite side of said cutting line.

4. Sawing apparatus for accurately sawing a rock on a selected cutting line comprising:
    a fixed hub mounted rotary saw;
    a power driven carriage feeding a rock mounted thereon toward said saw;
    a first rock gripping means mounted on said carriage to grip said rock at points on one side of said cutting line and including position adjustable finger portions gripping the surface of said rock at points transversely spaced from said cutting line
    a second rock gripping means mounted on said carriage to grip said rock at points on the opposite side of said cutting line and including position adjustable finger portions gripping the surface of said rock at points transversely spaced from said cutting line, said first and second rock gripping means being transversely movable with respect to each other on said carriage;
    said adjustable finger portions on each transverse side of said cutting line supporting said rock independently of said finger portions on the opposite side of said cutting line; and
    said first and second rock gripping means restraining said rock against transverse movement to prevent said rock from binding said saw during or after cutting, said rock gripping means making gripping contact with said rock only at points transversely spaced from said cutting line whereby said saw can completely sever said rock without contacting said rock gripping means. is moved longitudinally toward said saw said rock is moved toward the center of said rotary saw.

5. The sawing apparatus of claim 4 wherein the means mounted on said carriage gripping said rock includes a pedestal and a vertically oriented platform means mounted for selective rotation on said pedestal.

6. The sawing apparatus of claim 1 wherein both said first and second rock gripping means can support said rock to be severed independently to each other.

7. The sawing apparatus of claim 1 wherein each of said first and second rock gripping means support said rock to be severed without exerting transverse force on said rock toward said other rock gripping means.

8. The sawing apparatus of claim 1 wherein said first and second rock gripping means grip said rock at points on transversely opposite sides of said cutting line to support both portions of said rock after severance.

9. The sawing apparatus of claim 1 wherein said first gripping means is rotatable with respect to said power driven carriage and said second rock gripping means.

* * * * *

UNITED STATES PATENT OFFICE
CERTIFICATE OF CORRECTION

Patent No. 3,844,269　　　　　　　　Dated October 29, 1974

Inventor(s) Rudolph Rater

It is certified that error appears in the above-identified patent and that said Letters Patent are hereby corrected as shown below:

Column 10, line 55, delete "is moved longitudinally to-".

Column 10, line 56, delete "ward said saw said rock is moved toward the center".

Column 10, line 57, delete "of said rotary saw.".

Signed and sealed this 11th day of February 1975.

(SEAL)
Attest:

RUTH C. MASON
Attesting Officer

C. MARSHALL DANN
Commissioner of Patents
and Trademarks